Sept. 11, 1951 G. A. ROCKBURG ET AL 2,567,729
LUBRICATOR
Filed Dec. 10, 1948 3 Sheets-Sheet 1
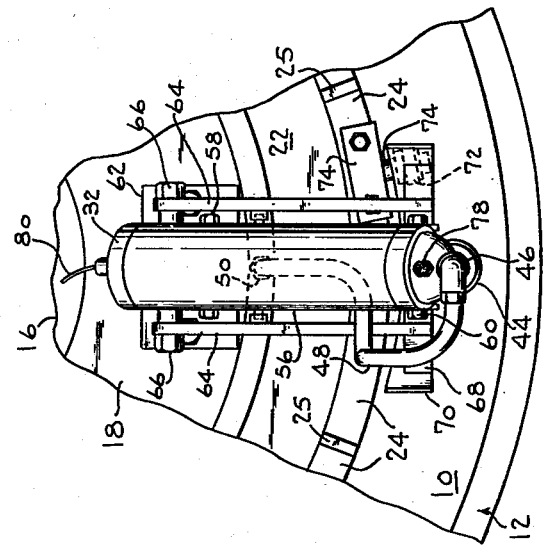
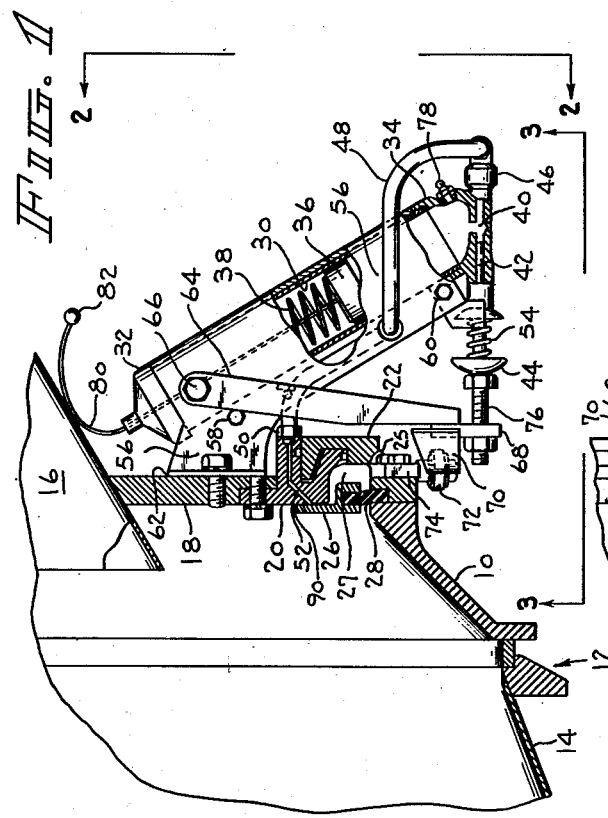
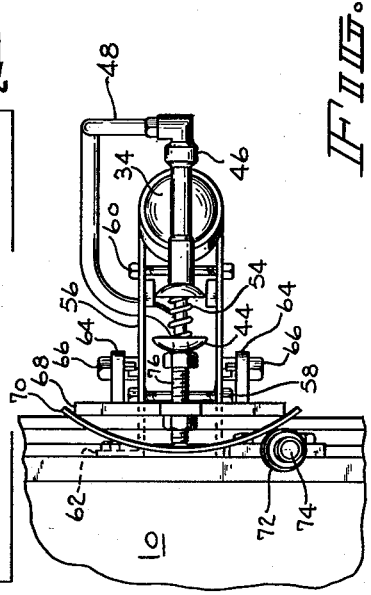
INVENTOR.
GEORGE A. ROCKBURG
HARRY C. PETERS
BY John W. Michael
ATTORNEY

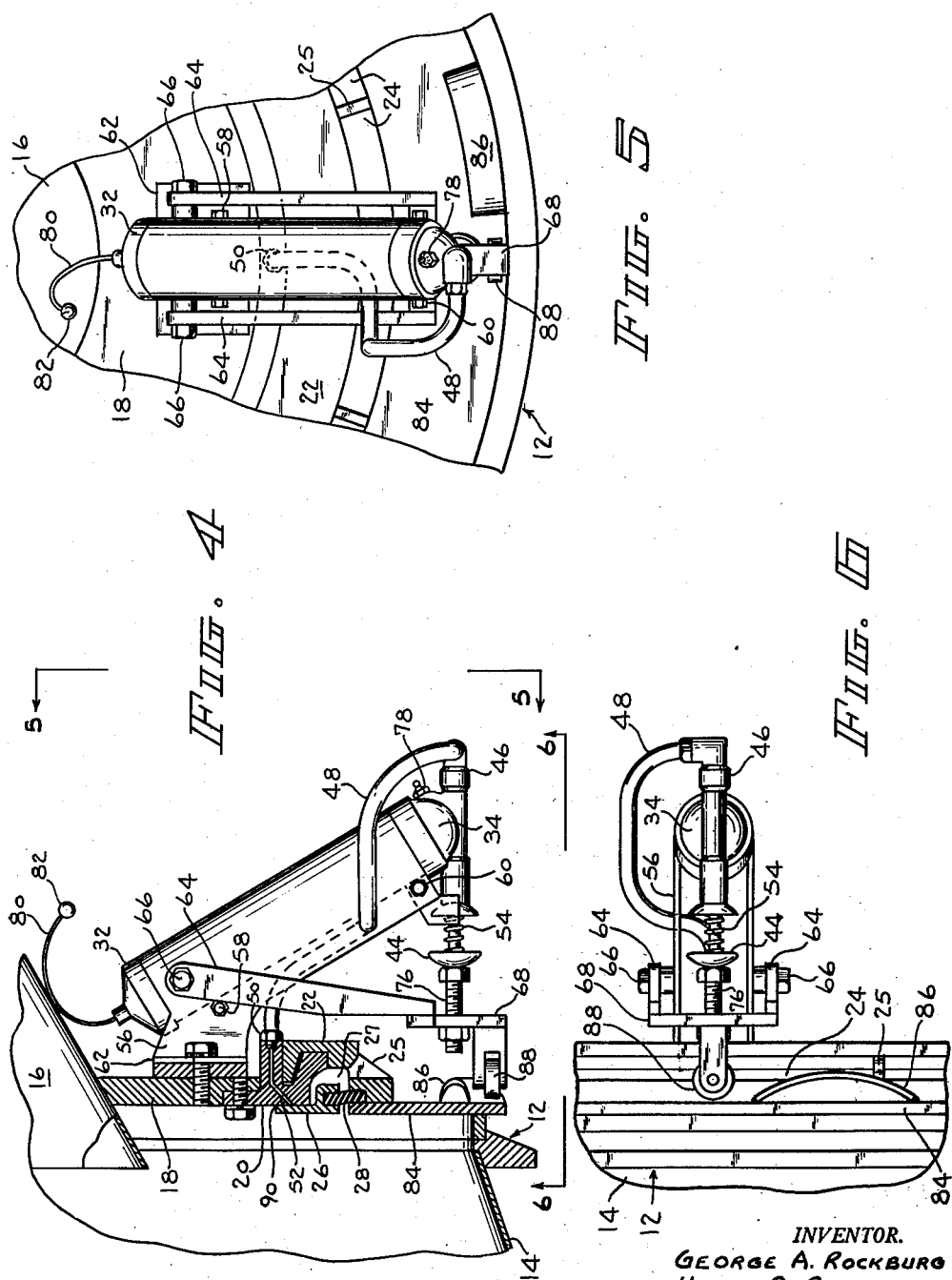

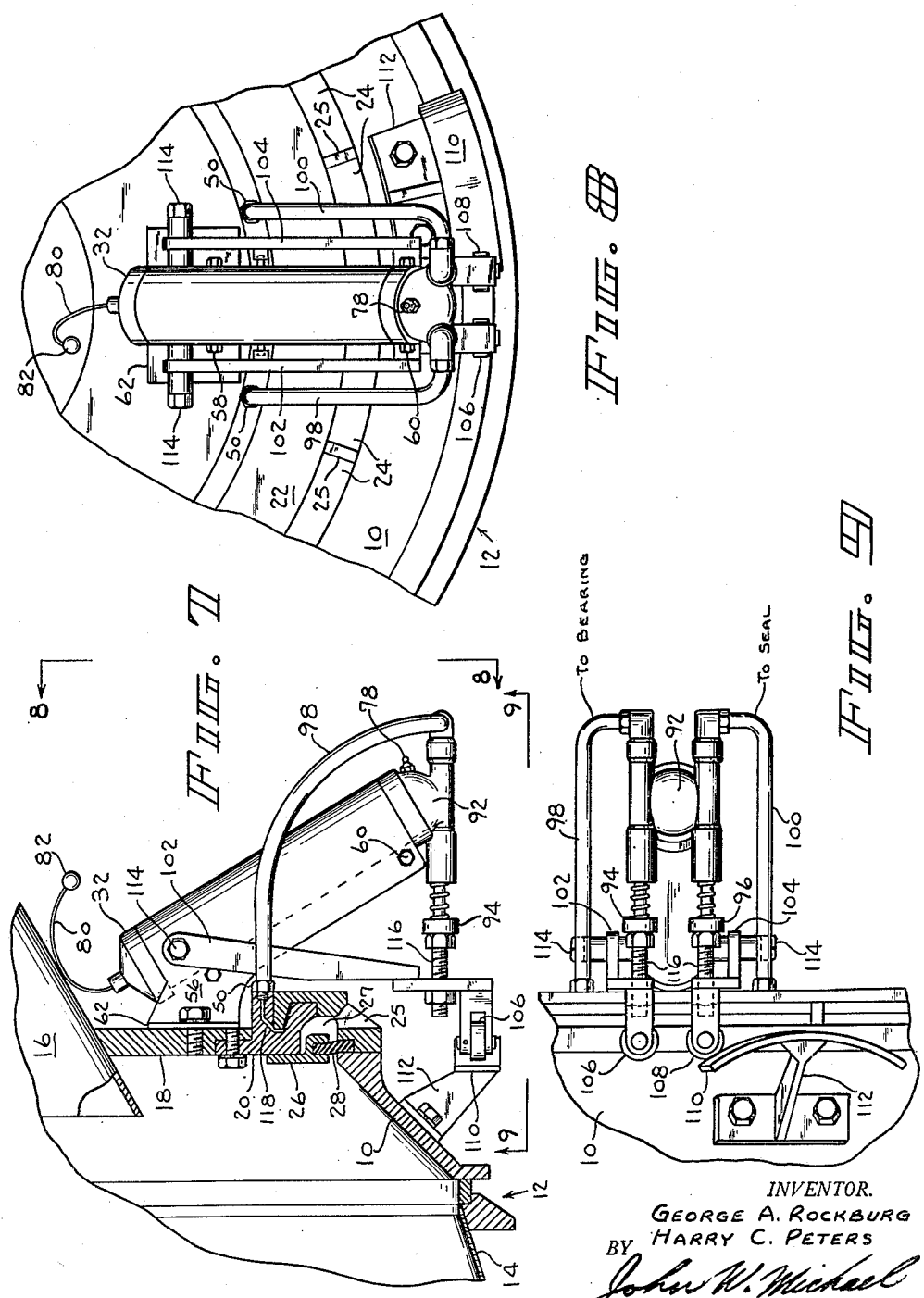

Patented Sept. 11, 1951

2,567,729

UNITED STATES PATENT OFFICE 2,567,729

LUBRICATOR

George A. Rockburg and Harry C. Peters, Milwaukee, Wis., assignors to The T. L. Smith Company, Milwaukee, Wis., a corporation of Wisconsin Application December 10, 1948, Serial No. 64,572

5 Claims. (Cl. 259—161)

This invention relates to a lubricator for mixers and more particularly to a lubricator for the bearing and seal between the charging hopper and the annular end plate commonly found on transit or truck type concrete mixers.

Truck mixers have a rotatable mixing drum mounted on the frame with the open end or mouth at the rear. The drum is provided with internal mixing elements which may aid charging when the drum rotates in one direction and aid discharging when rotation is reversed, or it may be rotated in the same direction at all times. The majority of truck mixers have a charging hopper which is movable into and out of contact with the drum mouth while others are provided with a hopper carried by the drum and mounted in a bearing so the hopper may be maintained stationary while the drum rotates. In either construction the hopper discharges into the drum centrally of the mixing elements and is, therefore, provided with an annular end plate to close the space between the hopper and the drum. In the first construction mentioned the closure plate is rotatable on a bearing carried by the hopper and seats on the drum mouth for rotation therewith while the other construction employs a plate integral with the drum and having the hopper centrally located therein and mounted in a bearing.

Thus it will be apparent that both constructions have a bearing between the hopper and the end plate. It is obvious that fine particles from the mix or grout in the drum would shortly destroy the bearing, and to prevent damage a seal is generally utilized to prevent direct contact of the mix with the bearing. If both the bearing and seal are not properly and frequently lubricated, however, grout may work into one or the other and initiate rapid wear. While the most frequent source of bearing or seal failure is neglecting lubrication, even daily lubrication is not entirely satisfactory since coacting relatively moving surfaces wipe grease away, leaving the parts exposed to foreign substances.

An object of this invention is to provide adequate lubrication for the bearing and seal between the hopper and closure plate of a truck mixer.

Another object is to provide means for lubricating the bearing or seal in response to relative rotation between the charging hopper and the end plate.

Another object is to provide a continuous supply of lubricant to the bearing or seal to prevent entrance of grout and to lubricate the parts.

A further object is to provide a continuous supply of grease to the bearing or seal during such times as the component parts are rotating with respect to each other.

Still a further object is to provide an automatic lubricator for the bearing or seal between the charging hopper and end plate.

A still further object is to provide an indicator showing whether the bearing or seal is being properly lubricated.

A further object is to provide an automatic lubricator for the bearing or seal containing an adequate supply of lubricant for operation over long periods and having means for indicating how much lubricant is in reserve.

Another object is to provide an automatic lubricator for the bearing or seal and having means for regulating the amount of lubricant delivered thereto over a given period of operation.

Other objects and advantages will be pointed out in, or be apparent from, the specification and claims, as will obvious modifications of the embodiments shown in the drawings, in which:

Fig. 1 is a fragmentary side elevation with parts broken away and parts in section of a charging hopper and drum provided with an automatic lubricator supplying grease to the seal;

Fig. 2 is an end view from line 2—2 of Fig. 1;

Fig. 3 is a bottom view from line 3—3 of Fig. 1;

Fig. 4 is similar to Fig. 1 but shows the lubricator modified to fit another type end plate assembly;

Fig. 5 is an end view from line 5—5 of Fig. 4;

Fig. 6 is a bottom view from line 6—6 of Fig. 4;

Fig. 7 is a view of a lubricator supplying grease to both the bearing and seal in a hopper constructed as in Fig. 1;

Fig. 8 is an end view of Fig. 7 on line 8—8; and

Fig. 9 is a bottom view of Fig. 7 on line 9—9.

Referring in detail to Figs. 1 through 3 which illustrate a portion of a charging hopper assembly of the type suspended from and carried by hangers or arms (not shown) pivoted on the truck frame for moving the closure or end plate into and out of contact with the drum mouth, it will be seen that the dished end plate 10 seats on drip ring 12 on the mouth of mixing drum 14, preferably having an inclined axis to provide a high discharge. The end plate is rotatably carried on the periphery of the charging hopper assembly comprising a funnel-like hopper 16 centrally located in a plate 18 having a notched bearing 20 bolted thereto by means of a complementary notched bearing member 22 cooperating with bearing 20 and bolted to the end plate. The bearing member 22 is provided with arcuate apertures 24 between connecting webs 25 to allow any dirt, grease, or grout in the space 27 between the bearing and seal to fall out of the space. Annular sealing ring 26 is carried by a resilient annulus 28 such as rubber, neoprene or other suitable material mounted between end plate 10 and bearing member 22 and seats against the inside face of bearing 20 to act as a seal. It will be noted that the resilient annulus is flexed inwardly to bias sealing ring 26 against the inside face of bearing 20 at all times. Thus sealing ring 26 and bearing member 22 rotate with end plate 10 as it frictionally engages and rotates with drum 14. The details of the bearing and seal means form the subject matter of the patent of George A. Rockburg, No. 2,544,545 dated March 6, 1951, and are shown here merely for the purpose of illustration. It is to be understood that any bearing and seal may be lubricated by the device shown herein.

In the embodiment illustrated in Figs. 1 through 3, an automatic lubricator is mounted on the hopper and supplies grease to seal between ring 26 and the inside face of bearing 20 in response to relative rotation between the end closure plate and hopper. The lubricator includes a grease gun reservoir or supply cylinder 30 having a cap 32 threaded on its upper end and a pump head 34 screwed on its lower end. Piston 36 is biased downwardly by spring 38 to force grease from cylinder 30 into the pump chamber 40 where plunger 42, moved to the right as the semi-spherical knob 44 is pushed to the right, forces grease from the chamber past a spring loaded ball check valve within fitting 46 into conduit 48 connected to grease fitting 50 leading into bore 52 terminating at the seal between ring 26 and the inside face of bearing 20. Compressed spring 54 returns head 44 and plunger 42 to the left after each pumping stroke.

The grease gun is rigidly mounted on the hopper by means of bracket 56 wrapped around cylinder 30 with through-bolts 58 and 60 clamping the bracket around the grease gun. The upper end of bracket 56 is provided with flanges 62 which are bolted to plate 18. It will be noted that bracket 56 is of such length as to just fit within the shoulders provided by the threaded cap 32 and pump head 34, thus preventing movement of the grease gun along its longitudinal axis. Depending arms 64 are pivoted at their upper ends on pins 66 mounted on each side of the bracket 56 and are joined at their lower ends by means of plate 68 welded thereto. A cam surface 70 welded to the plate 68 extends into the path of roller 72 mounted on a pin 74 depending from the end plate 10. Thus, with every revolution roller 72, rotating with the end plate, strikes cam 70 to pivot arms 64 counterclockwise and move bolt 76, threaded into plate 68, against plunger knob 44 to feed grease into the seal part of the bearing and seal means between the hopper and the closure plate.

It will be noted that the stroke of plunger 42 may be readily varied by adjusting bolt 76 in plate 68. The grease gun may contain an adequate supply of grease for three or four weeks' operation without refilling. As is conventional, the gun is refilled by feeding grease into the cylinder through fitting 78 in pump head 34 to move piston 36 upwardly. Piano wire 80, connected to piston 36 and extending out of a central aperture in cap 32 to a length dependent upon the position of the piston in the cylinder, may be provided with a brightly colored indicator 82 which may be readily observed to ascertain the amount of grease remaining in the gun. Thus the operator may tell at a glance whether or not there is an adequate supply of grease in the gun.

The automatic lubricator in Figs. 4 through 6 also supplies grease to the seal, but in this showing the end plate 84 is flat rather than dished as in Figs. 1 through 3. Since there is no problem of clearance with the arms which pivotally carry the hopper assembly on the truck frame, the cam 86 may now be mounted on end plate 84 to actuate the roller type cam follower 88 carried by plate 68. Thus both modifications are actuated by a fixed-rise cam mechanism with the stroke adjustment being made by turning bolt 76 into or out of plate 68.

Thus in the modifications illustrated in Figs. 1 through 6 the grease supplied through bore 52 continually oozes from the seal and from a bead at 90 which positively prevents entrance of grout. As the concrete mix in the drum tends to wipe away the bead at 90, additional grease is forced out to maintain the seal.

Should it be desired to lubricate both the seal and the bearing, it is necessary to modify the single pump lubricator in some respects since a simple branched conduit from a single pump would not function properly due to the natural tendency of the grease to follow the course of least resistance which could result in either the bearing or the seal receiving the majority of the grease. While there are several systems which may be utilized, it is preferred to provide the grease gun (Figs. 7 through 9) with a multiple pump head 92 having two pumping cylinders with separately actuated plungers 94, 96 dispensing grease through respective conduits 98, 100. In order to separately actuate the plungers 94, 96, each of the independently pivoted depending arms 102, 104 are provided with a roller follower 106, 108 adapted to ride on a fixed-rise cam 110 mounted on the bracket 112 bolted to dished end plate 10. Thus as follower 108 rides cam 110 arm 104 will pivot about pin 114 to act through the stroke adjusting bolt 116 on plunger 96 to force grease through conduit 100 to the seal between ring 26 and bearing 20 through a bore not shown but similar to that illustrated in Figs. 1 through 6. As rotation continues follower 106 rides on cam 110 to similarly actuate plunger 94 through the stroke adjusting bolt 116 to supply grease through conduit 98 and bore 118 to the bearing. It will be noted that the stroke of either plunger 94, 96 may be separately regulated by adjusting the corresponding bolt 116 with respect to the plate on the swinging end of the arms. This is an advantage over a balanced resistance branched feed from a single pump, for example, in that the feed to the bearing or seal may be independently adjusted as indicated by the circumstances. It will be apparent that a single follower could be used if the free ends of arms 102, 104 were connected as in Figs. 1 through 6. Both adjustment bolts 116 may be retained to provide for independent adjustment of the corresponding pump stroke.

Thus it will be seen that the single grease gun may be modified to separately supply both the bearing and the seal with the desired amount of grease. The piano wire 80 having the indicator 82 on its end still serves to provide a ready check on the grease supply. It will be noted that grease is only supplied to the bearing and seal when there is relative rotation between the closure plate and the hopper. While all the embodiments shown incorporate the type of charging hopper which is pivoted on arms carried by the frame so that the end plate may be moved into or out of contact with the drip ring on the drum mouth, it will be apparent that this invention permits of ready application to those structures wherein the charging hopper assembly is carried on a shaft extending along the drum axis and on those structures wherein the end plate is integral with the mixing drum and the hopper is rotatably mounted in the center of the drum-carried end plate where it may be retained in a stationary position with the hopper end up for charging or in a stationary position with the open hopper end facing down for discharging since all of these truck mixer structures embody a stationary charging hopper mounted centrally of the end plate. Of course, if the end plate were omitted the cam (or follower) could be carried by the drum.

It will be apparent, therefore, that I have provided automatic lubrication for the bearing or seal between the charging hopper and the end plate of any type of truck mixer. Obvious modifications and departures from the structures illustrated will occur to those skilled in the art, and it is for this reason that this invention is to be limited only by the scope of the claims.

We claim:

1. In a mixer, a rotating mixing drum having a mouth through which the mix passes into and out of the drum, an apertured end plate rotatable with the drum, a charging hopper assembly, means for non-rotatably mounting same for discharging mix material into the drum mouth through the aperture of the plate, bearing means mounting the plate for rotation on said hopper assembly, grease supply means including a grease dispensing device mounted on the hopper assembly, means operatively connecting the grease dispensing device to the bearing means to supply grease thereto when said grease dispensing device is actuated, and means on said plate for periodically actuating the grease dispensing device to deliver grease to the bearing means when the plate rotates relative to the hopper assembly.

2. In a mixer, a rotating mixing drum having a mouth through which the mix passes into and out of the drum, an apertured end plate rotatable with the drum, a charging hopper assembly, means for non-rotatably mounting same for discharging mix material into the drum mouth through the aperture of the plate, bearing means mounting the plate for rotation on said hopper assembly, grease supply means including a grease dispensing device mounted on the hopper assembly, said grease dispensing device including a reciprocable grease discharge plunger, means operatively connecting the grease dispensing device to the bearing means to supply grease thereto when said grease dispensing device is actuated, and means on said plate for periodically actuating the plunger of the grease dispensing device to deliver grease to the bearing means when the plate rotates relative to the hopper assembly.

3. In a mixer, a rotating mixing drum having a mouth through which the mix passes into and out of the drum, an apertured end plate rotatable with the drum, a charging hopper assembly, means for non-rotatably mounting same for discharging mix material into the drum mouth through the aperture of the plate, bearing means mounting the plate for rotation on said hopper assembly, bearing seal means to prevent ingress of mix material from the drum into the bearing, grease supply means including plural grease dispensing devices mounted on the hopper assembly, means operatively connecting the grease dispensing devices to the bearing means and to the bearing seal means, respectively, to supply grease thereto when said grease dispensing devices are actuated, and means on said plate for periodically actuating the grease dispensing devices to deliver grease to the bearing means and to the bearing seal means, respectively, when the plate rotates relative to the hopper assembly.

4. In a mixer, a rotating mixing drum having a mouth through which the mix passes into and out of the drum, an apertured end plate rotatable with the drum, a charging hopper assembly, means for non-rotatably mounting same for discharging mix material into the drum mouth through the aperture of the plate, bearing means mounting the plate for rotation on said hopper assembly, bearing seal means to prevent ingress of mix material from the drum into the bearing, grease supply means including plural grease dispensing devices mounted on the hopper assembly, means operatively connecting the grease dispensing devices to the bearing means and to the bearing seal means, respectively, to supply grease thereto when said grease dispensing devices are actuated, means on said plate for periodically actuating the grease dispensing devices to deliver grease to the bearing means and to the bearing seal means, respectively, when the plate rotates relative to the hopper assembly, and means for selectively controlling the discharge of grease from said dispensing devices for delivering desired amounts of grease to the bearing means and to the bearing seal means.

5. The apparatus described in claim 2 wherein the means on the plate for periodically actuating the plunger of the grease dispensing device includes a cam member rotatable with the plate.

GEORGE A. ROCKBURG.
HARRY C. PETERS.

REFERENCES CITED

The following references are of record in the file of this patent:

UNITED STATES PATENTS

| Number | Name | Date |
|---|---|---|
| 1,372,172 | Larson | Mar. 22, 1921 |
| 1,443,101 | Strauss | Jan. 23, 1923 |
| 1,553,202 | Symons | Sept. 8, 1925 |
| 1,665,519 | Webb | Apr. 10, 1928 |
| 1,904,168 | Reid | Apr. 18, 1933 |
| 2,061,422 | Gee | Nov. 17, 1936 |
| 2,374,912 | Barnes | May 1, 1945 |
| 2,439,250 | Hilkemeier | Apr. 6, 1948 |
| 2,454,940 | Peters | Nov. 30, 1948 |